US010947101B2

United States Patent
Asami et al.

(10) Patent No.: US 10,947,101 B2
(45) Date of Patent: Mar. 16, 2021

(54) BEVERAGE SUPPLY APPARATUS (71) Applicant: SANDEN RETAIL SYSTEMS CORPORATION, Isesaki (JP)

(72) Inventors: Toru Asami, Isesaki (JP); Takahiro Toriumi, Isesak (JP)

(73) Assignee: SANDEN RETAIL SYSTEMS CORPORATION, Gunma (JP)

( * ) Notice: Subject to any disclaimer, the term of this patent is extended or adjusted under 35 U.S.C. 154(b) by 0 days.

(21) Appl. No.: 16/614,719

(22) PCT Filed: Apr. 23, 2018

(86) PCT No.: PCT/JP2018/017355
§ 371 (c)(1),
(2) Date: Nov. 18, 2019

(87) PCT Pub. No.: WO2018/211954
PCT Pub. Date: Nov. 22, 2018

(65) Prior Publication Data
US 2020/0165117 A1 May 28, 2020

(30) Foreign Application Priority Data

May 19, 2017 (JP) .............................. JP2017-100281

(51) Int. Cl.
A47J 31/40 (2006.01)
A47J 31/46 (2006.01)
(Continued)

(52) U.S. Cl.
CPC ............ *B67D 1/0871* (2013.01); *A47J 31/40* (2013.01); *A47J 31/46* (2013.01); *B67D 1/0857* (2013.01);
(Continued)

(58) Field of Classification Search
CPC .. B67D 1/0871; B67D 1/0857; B67D 1/0895; B67D 2210/00118; B67D 2210/00157;
(Continued)

(56) References Cited

U.S. PATENT DOCUMENTS 5,947,330 A * 9/1999 Kim ....................... G07F 13/065
222/2
10,151,617 B2 * 12/2018 Ellwein ............... G01F 23/2922
(Continued)

FOREIGN PATENT DOCUMENTS

EP 10448 4/1980
JP 3029960 10/1996
JP 2005-66314 3/2005

*Primary Examiner* — Frederick C Nicolas
(74) *Attorney, Agent, or Firm* — Cozen O'Connor (57) ABSTRACT A beverage supply apparatus includes cooling device 6, milk tank 5 in storage chamber 6a of cooling device 6, and detection device 7 that detects the milk. Detection device 7 has first light guide body 7c to penetrate partition wall 12 having a multilayer box body that partitions storage chamber 6a, second light guide body 7d to penetrate partition wall 12 which faces first light guide body 7c, light projection unit 7a attached to partition-wall outer-surface-side end of first light guide body 7c to project light via the body 7c, and light receiving unit 7b attached to the partition-wall outer-surface-side end of second light guide body 7d to receive light transmitted through milk tank 5 via second light guide body 7d. The detection device detects the presence or absence of or the remaining amount of milk based on a light reception state in the light receiving unit 7b.

7 Claims, 7 Drawing Sheets (51) Int. Cl.
*G01F 23/292* (2006.01)
*B67D 1/08* (2006.01)
*G01F 23/00* (2006.01)
*B67D 1/12* (2006.01)
*B67D 1/07* (2006.01)
*A47J 31/41* (2006.01)

(52) U.S. Cl.
CPC ......... *B67D 1/0895* (2013.01); *G01F 23/292* (2013.01); *A47J 31/41* (2013.01); *A47J 2203/00* (2013.01); *B67D 1/07* (2013.01); *B67D 1/1247* (2013.01); *B67D 1/1275* (2013.01); *B67D 2210/00118* (2013.01); *B67D 2210/00157* (2013.01); *G01F 23/0007* (2013.01); *G01F 23/2922* (2013.01)

(58) Field of Classification Search
CPC ...... B67D 1/1247; B67D 1/1275; B67D 1/07; A47J 31/40; A47J 31/46; A47J 2203/00; A47J 31/41; G01F 23/292; G01F 23/2922; G01F 23/0007
See application file for complete search history.

(56) References Cited

U.S. PATENT DOCUMENTS

| | | | |
|---|---|---|---|
| 2018/0052034 A1* | 2/2018 | Ellwein | G01N 21/15 |
| 2018/0155671 A1* | 6/2018 | Dupont | B64D 37/32 |
| 2018/0284017 A1* | 10/2018 | Grinderslev | G01F 23/292 |
| 2020/0158555 A1* | 5/2020 | Li | G01F 23/2922 |

* cited by examiner

BEVERAGE SUPPLY APPARATUS

RELATED APPLICATIONS

This is a U.S. National Phase Application under 35 USC 371 of International Application PCT/JP2018/017355 filed on Apr. 23, 2018.

This application claims the priority of Japanese application no. 2017-100281 filed May 19, 2017, the entire content of which is hereby incorporated by reference.

TECHNICAL FIELD

The present invention relates to a beverage supply apparatus for supplying a beverage such as a liquid beverage in a liquid beverage tank.

BACKGROUND ART

Patent Document 1 discloses a milk supply device (hereinafter referred to as a beverage supply apparatus) for supplying milk that is stored at low temperature comprising: a refrigeration unit (hereinafter referred to as a cooling device) having a refrigeration compartment (hereinafter referred to as a storage chamber) that is partitioned by a heat insulating wall, a door and the like; and a milk container (hereinafter referred to as a liquid beverage container) such as a milk pack that is accommodated in the storage chamber. The beverage supply apparatus further includes a measuring device for measuring the remaining amount of milk in the liquid beverage container to monitor the remaining amount of milk and inform an administrator or the like to replace the liquid beverage container. A capacitance type sensor or a weight scale is employed as the measuring device. The capacitance type sensor which is attached to the side surface of the liquid beverage container measures the remaining amount of milk by detecting, from the outside of the liquid beverage container, the capacitance of the milk that changes depending on the remaining amount of milk. The weight scale which is installed in the storage chamber measures the remaining amount of milk based on the weight change of the liquid beverage container that is mounted on the weight scale.

REFERENCE DOCUMENT LIST

Patent Document

Patent Document 1: JP 2005-66314 A

SUMMARY OF THE INVENTION

Problem to be Solved by the Invention

However, in the beverage supply apparatus disclosed in Patent Document 1, the measuring device (the capacitance type sensor or the weight scale) for measuring the remaining amount of milk is installed in the storage chamber of the cooling device that has a door. For this reason, for example, when an administrator or the like opens the door at the time of replacing the liquid beverage container or the like, condensation water adheres to the outer surface, the inside and the like of the measuring device as a result of ingress of external air into the storage chamber. Owing to the condensation water, there may be an occurrence of detection operation failure and damage of the measuring device. This problem is not limited to supply devices for milk but is common to beverage supply apparatuses for beverages including various liquid beverages and liquid beverages such as mixed beverages of the liquid beverage and air. Additionally, although the measuring device measures (detects) the remaining amount of milk in Patent Document 1, the same problem occurs when simply detecting the presence or absence of a liquid beverage such as milk.

Therefore, in view of the above circumstances, an object of the present invention is to provide a beverage supply apparatus which includes a detection device that detects the presence or absence of, or the remaining amount of, a liquid beverage, and that can prevent or inhibit the occurrence of detection operation failure and damage due to the ingress of external air into a storage chamber of a cooling device.

Means for Solving the Problem

According to one aspect of the present invention, there is provided a beverage supply apparatus which comprises: a cooling device which has a storage chamber partitioned by a partition wall and which cools air in the storage chamber; a liquid beverage container accommodated in the storage chamber; and a detection device for detecting presence or absence of, or a remaining amount of, a liquid beverage in the liquid beverage container, wherein the beverage supply apparatus supplies a beverage including the liquid beverage cooled by the cooling device to an outer portion, wherein the partition wall is a box body having a multilayer structure, and an end part of the box body has an opening that may be closed by a predetermined closing member; the detection device has a first light guide body, a second light guide body, a light projection unit, and a light receiving unit, and the detection device detects the presence or absence of or the remaining amount of the liquid beverage based on a light reception state in the light receiving unit; the first light guide body is provided to penetrate a predetermined part of the partition wall; the second light guide body is provided to penetrate a predetermined part of the partition wall which faces the first light guide body; the light projection unit is attached to a partition-wall outer-surface-side end of the first light guide body and projects light toward the liquid beverage container via the first light guide body; the light receiving unit is attached to a partition-wall outer-surface-side end of the second light guide body and can receive the light transmitted through the liquid beverage container via the second light guide body; and the liquid beverage container is made of the member in which at least parts corresponding to the first light guide body and the second light guide body can transmit the light.

Effects of the Invention

In the beverage supply apparatus according to one aspect of the present invention, the storage chamber of the cooling device is partitioned by a partition wall which is formed of a box body having a multilayer structure and an end part of the box body having an opening closed by a predetermined closing member. The detection device projects light toward the liquid beverage container via the first light guide body by using the light projection unit which is attached to the partition-wall outer-surface-side end of the first light guide body that is provided to penetrate a predetermined part of the partition wall. Furthermore, the detection device can receive the light transmitted through the liquid beverage container via the second light guide body by using the light receiving unit which is attached to the partition-wall outer-surface-side end of the second light guide body that is provided to penetrate a predetermined part of the partition wall which faces the first light guide body. The detection device detects the presence or absence of, or the remaining amount of, the liquid beverage in the liquid beverage container based on the light reception state in the light receiving unit. That is, the light projection unit in the detection device can project light from the exterior of the partition wall which is formed of the box body that partitions the storage chamber toward the storage chamber via the first light guide body. Also, the light receiving unit in the detection device can receive the light transmitted through the liquid beverage container at the exterior of the partition wall which is formed of the box body via the second light guide body. Thus, both the light projection unit and the light receiving unit in the detection device are disposed externally of the partition wall which is formed of the box body.

Accordingly, for example, even if there is ingress of external air in the storage chamber at the time of replacing the liquid beverage container and the like, the light projection unit and the light receiving unit are both disposed externally of the partition wall, and thus, the adhesion of condensation water to the light projection unit and the light receiving unit is prevented or inhibited. As a result, the occurrence of the detection operation failure or damage in the detection device is prevented or inhibited.

Therefore, there can be provided the beverage supply apparatus which includes the detection device that detects the presence or absence of or the remaining amount of the liquid beverage, and that can prevent or inhibit the occurrence of the detection operation failure or damage due to the ingress of external air into the storage chamber of the cooling device.

MODE FOR CARRYING OUT THE INVENTION

Basic Arrangement of Beverage Supply Apparatus

Embodiments of the present invention will now be described with reference to the accompanying drawings.

Figure 1:
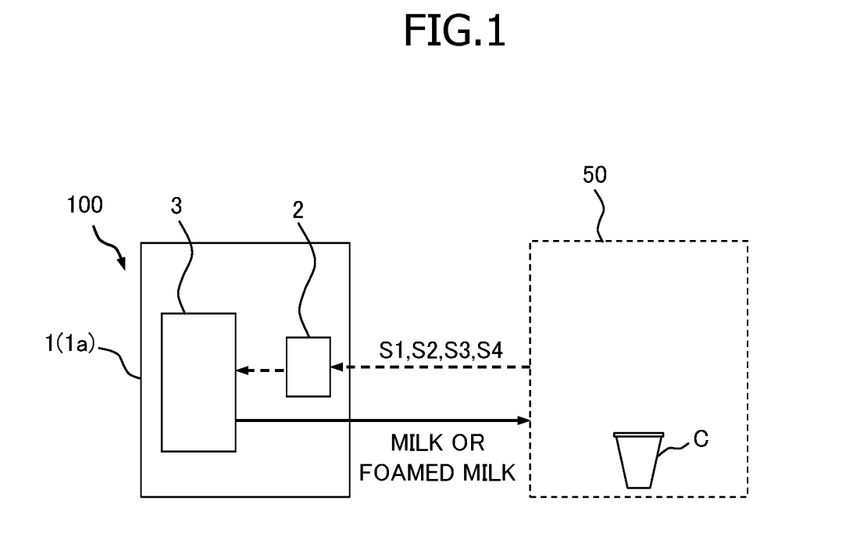
FIG. 1 is a block diagram illustrating a schematic configuration of the beverage supply apparatus according to an embodiment of the present invention.
Figure 2:
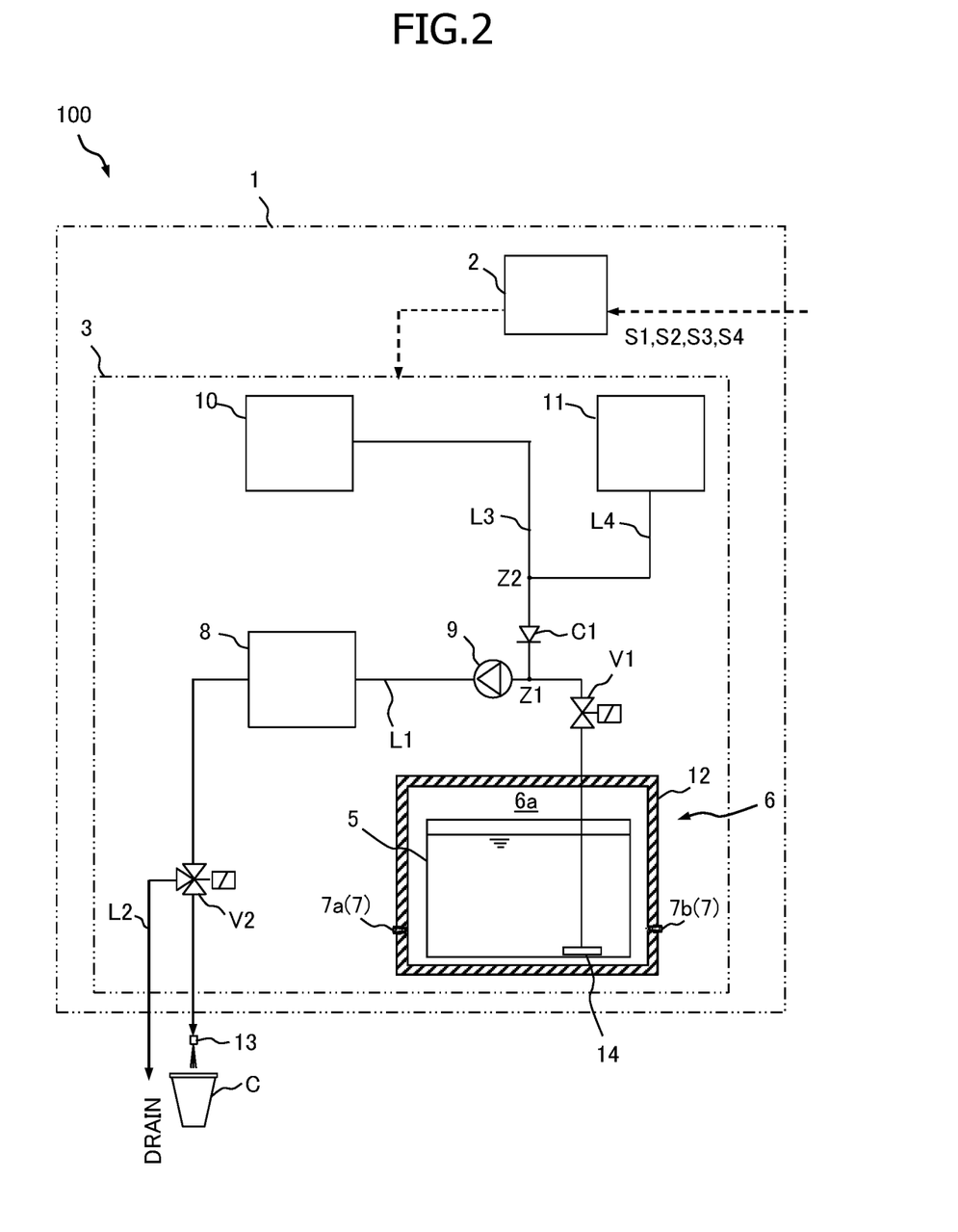
FIG. 2 is a schematic flow line diagram of the beverage supply apparatus.
Figure 3:
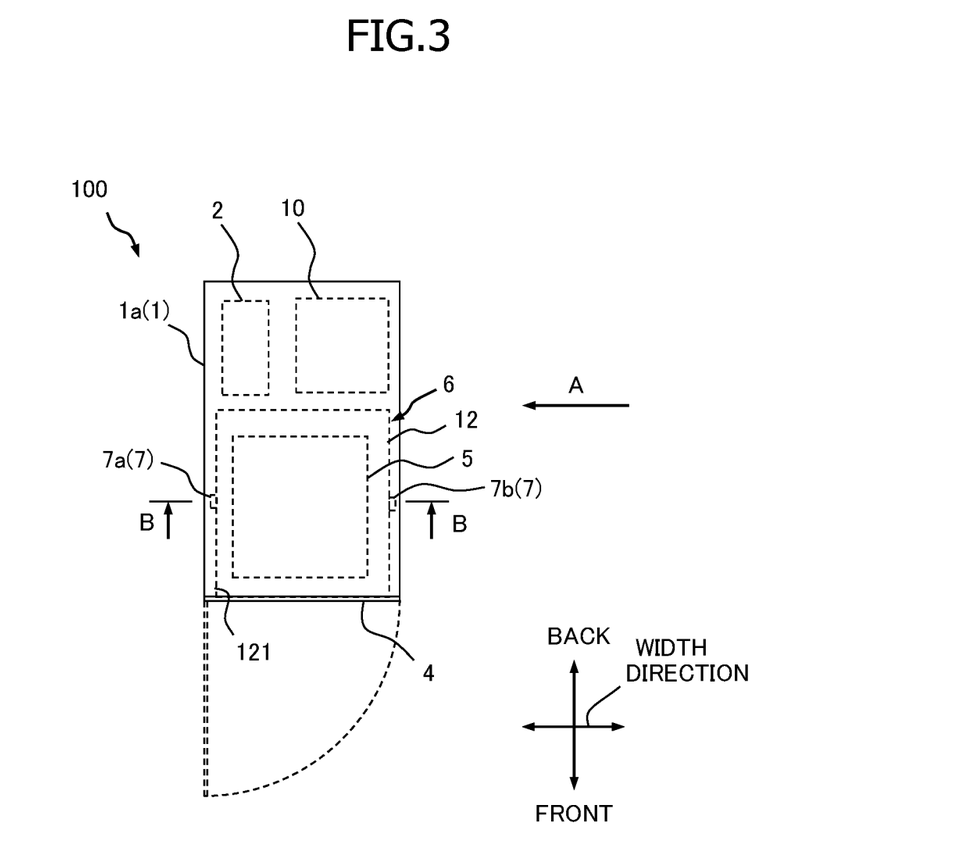
FIG. 3 is a top plan view of the beverage supply apparatus.
Figure 4:
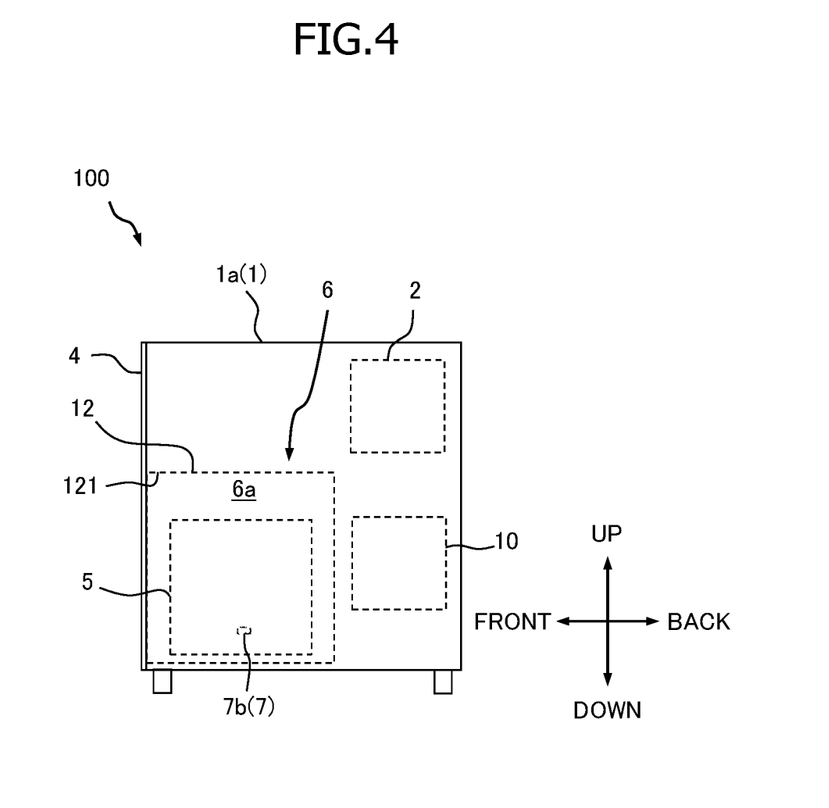
FIG. 4 is a side view of the beverage supply apparatus.

FIG. 1 is the block diagram for explaining the schematic configuration of the beverage supply apparatus 100 of an embodiment, and FIG. 2 is the flow line diagram of the beverage supply apparatus 100. FIGS. 3 and 4 respectively show the appearance of the beverage supply apparatus 100. FIG. 3 is a top plan view, and FIG. 4 is a side view as seen from the direction of the arrow A illustrated in FIG. 3.

In the present embodiment, as illustrated in FIG. 1, described is an example of the beverage supply apparatus 100 which is provided adjacent to a coffee server 50 and is used as an optional apparatus of the coffee server 50.

The coffee server 50, for example, brews coffee from coffee powder, and serves the brewed coffee in a cup C. According to the request of the customer or the like, the coffee server 50 can serve preferred coffee by adding liquid milk (hereinafter, simply referred to as "milk"), foamed milk (that is, the mixed beverage of milk and air with a relatively low viscosity) and whipped milk (that is, the mixed beverage of milk and air with high viscosity) as the liquid beverage to the brewed coffee.

The beverage supply apparatus 100 is the apparatus which can supply milk or the mixed beverage of milk and air in a hot (warm) or cold state, and has a housing 1 constituting the apparatus shell, a controller 2 and a main body unit 3. In the present embodiment, the beverage supply apparatus 100 supplies, to the outer portion (the coffee server 50), the milk or the mixed beverage, that is, the beverage including milk, in the cup C which is provided in the coffee server 50.

The housing 1 is formed of, for example, the box body which includes a substantially elongated rectangular parallelepiped frame (not illustrated), a plurality of exterior covers 1a attached the frame, and the like. The controller 2 and the main body unit 3 are disposed in the housing 1. Specifically, the front end portion of the housing 1 in the front-back direction (specifically, the administrator operation surface side end of the beverage supply apparatus 100) is open. The front end portion of the housing 1 has attached thereto a closable door 4 (see FIGS. 3 and 4) that opens and closes the opening of the housing 1. The administrator opens the door 4 to perform operations such as the replacement of a milk tank 5, described later, and the replenishment of milk into the milk tank 5.

As illustrated in FIG. 1, the controller 1 controls operation of the main body unit 3. The controller 2 controls the operation of each instrument (a cooling device 6, a heating device 8, a pump 9, a water supply device 10, an air supply device 11, an on-off valve V1, a switching valve V2 and the like described later) of the main body unit 3 to supply the milk or the mixed beverage in the hot or cold state based on the instructions from the coffee server 50, for example. The beverage supply apparatus 100 controls the operation of each instrument to supply the hot milk when the hot milk supply instruction S1 is input to the controller 2, supply the hot mixed beverage when the hot mixed beverage supply instruction S2 is input to the controller 2, supply the cold milk when the cold milk supply instruction S3 is input to the controller 2, and supply the cold mixed beverage when the cold mixed beverage supply instruction S4 is input to the controller 2. When none of the supply instructions (S1-S4) is input to the controller 2, the beverage supply apparatus 100 enters into the standby state.

In the present embodiment, the main body unit 3, as illustrated in FIG. 2, includes the milk tank 5, the cooling device 6, the detection device 7, the heating device 8, the pump 9, the water supply device 10 and the air supply device 11. In FIGS. 3 and 4, the heating device 8, the pump 9, and the air supply device 11 in the main body unit 3 are not illustrated in order to simplify the drawings.

The milk tank 5 is the tank for storing (holding) the milk as the liquid beverage. The milk tank 5 is accommodated in the cooling device 6 (specifically, a storage chamber 6a described later), and is capable of storing the milk at appropriate low temperature. In the present embodiment, the entire milk tank 5 is made of the member that can transmit light. Specifically, the milk tank 5 is made of a transparent resin material, and is formed in a substantially rectangular parallelepiped shape by injection molding. In the present embodiment, the milk tank 5 corresponds to the "liquid beverage container" according to the present invention.

As illustrated in FIG. 2, the cooling device 6 has the storage chamber 6a that is partitioned by the partition wall 12, and cools the air in the storage chamber 6a. The cooling device 6 accommodates the milk tank 5 in the storage chamber 6a and is capable of retaining the internal temperature at the appropriate low-temperature set temperature. The internal temperature in the cooling device 6 is controlled to be held, for example, below 10° C., specifically in the range of 2 to 3° C. As illustrated in FIGS. 3 and 4, the cooling device 6 is disposed close to the attachment end portion of the door 4 in the housing 1 (that is, the front end portion of the housing 1).

The partition wall 12 of the cooling device 6 is the box body having the multilayer structure, and an end part of the box body (the front end portion in the figure) has an opening 121 which is closed by the door 4. Specifically, the partition wall 12 forms the outer shell of the cooling device 6 and is formed in the substantially rectangular parallelepiped shape. Moreover, although not illustrated, the cooling device 6 includes therein the machine storage chamber which is partitioned from the storage chamber 6a. In this machine storage chamber, equipment such as the cooling unit for cooling the inside of the storage chamber 6a is disposed. In the present embodiment, the door 4 corresponds to a "predetermined closing member" according to the present invention. The multilayer structure of the partition wall 12 will be described in detail later.

In the present embodiment, the detection device 7 detects the presence or absence of milk in the milk tank 5. The detection device 7 includes a light projection unit 7a which projects light toward the milk tank 5, a light receiving unit 7b which can receive the light transmitted through the milk tank 5, and the detection unit (not illustrated); and detects the presence or absence of milk based on the light reception state in the light receiving unit 7b. The light projection unit 7a is made of, for example, the light emitting element, and emits light when the power is supplied from the controller 2. The light receiving unit 7b is made of, for example, the light receiving element, and outputs the signal according to the received light intensity to the detection unit. The detection unit which is incorporated in the controller 2, for example, detects the presence of milk when the signal level from the light receiving unit 7b is equal to or lower than a predetermined threshold (that is, when the received light intensity is equal to or lower than the predetermined level), and detects the absence of milk when the signal level from the light receiving unit 7b exceeds the threshold (that is, when the received light intensity exceeds the predetermined level). When the detection unit of the detection device 7 obtains the detection result of the absence of milk, the controller 2 notifies of the absence of milk in the milk tank 5 by a warning sound and a warning display, for example, forcibly stops supplying milk, and prompts the administrator to replace the milk tank 5. The expression "the absence of milk" does not only mean that there is no milk at all in the milk tank 5 but also means that the remaining amount of milk is small. The attachment structure and attachment position of the light projection unit 7a and the light receiving unit 7b will be described in detail later.

The heating device 8 is the device for heating the milk or the mixed beverage. As illustrated in FIG. 2, the heating device 8 is disposed in the course of a milk flow path (beverage flow path) L1 that connects the milk tank 5 and a beverage delivery port 13. Although not illustrated, the heating device 8 has the heat source unit that heats the milk or the mixed beverage flowing through the milk flow path L1. The milk flow path L1 connects the strainer 14 disposed in the milk tank 5 and the beverage delivery port 13, and mainly the milk or mixed beverage flows through the milk flow path L1. Although not illustrated, the heating device 8 has the bypass pipe that bypasses the heat source unit. Based on the signal from the controller 2, the heating device 8 is capable of switching the operation in which the milk or the mixed beverage that is flowed in is flowed out as it is without being heated via the bypass tube, and the operation in which the milk or the mixed beverage that is flowed in is heated and flowed out via the heat source unit. Additionally, the drain pipe L2 is connected to a predetermined part (in FIG. 2, the part to which a switching valve V2 described later is connected) of the flow path between the heating device 8 and the beverage delivery port 13 in the milk flow path L1. The beverage delivery port 13 is, for example, the nozzle unit from which the milk or the mixed beverage is delivered, and is disposed above the cup C.

The pump 9 mainly draws and delivers the milk from the milk tank 5, and the pump 9 is provided at a predetermined part closer to the milk tank 5 than the heating device 8 in the milk flow path L1.

The water supply device 10 is the device for supplying, via a water flow path L3, the water (rinse water) for rinsing and cleaning the inside of the milk flow path L1 after supplying the milk and the mixed beverage, for example. Although not illustrated, the water supply device 10 includes the water tank that stores water, the pump that is driven based on the signal from the controller 2, the electromagnetic on-off valve, and the like. One end of the water flow path L3 is connected to the water supply device 10, and the other end is connected to a predetermined part (hereinafter, referred to as the connecting part Z1) between the pump 9 and the strainer 14 in the milk flow path L1. The water supply device 10 supplies water into the milk flow path L1 via the connecting part Z1.

The air supply device 11 is the device for producing the mixed beverage and for supplying the air such as the air purge in the milk flow path L1 via the air flow path L4. This air purge is executed for the purpose of blowing away water, etc. in the piping by vigorously causing the air to flow through the piping such as the milk flow path L1. The air amount (flow rate) required for the air purge is larger than the air amount (flow rate) required for the production of the mixed beverage, and thus, it is necessary to adjust the air amount, for example, when producing the mixed beverage. Therefore, the air supply device 11 is capable of adjusting the flow rate of the air that is supplied to the milk flow path L1. Although not illustrated, the air supply device 11 includes the air supply pump that is driven based on the signal from the controller 2 and has the variable delivery flow rate, the electromagnetic on-off valve that is also operated based on the signal from the controller 2, and the like. One end of the air flow path L4 is connected to the air supply device 11, and the other end is connected to the predetermined part (hereinafter, referred to as the connecting part Z2) of the water flow path L3. The air supplied from the connecting part Z2 into the water flow path L3 flows through the flow path between the connecting part Z2 and the connecting part Z1 in the water flow path L3, and is eventually supplied into the milk flow path L1 through the connecting part Z1.

In the present embodiment, by operating the air supply device 11 (more specifically, further by opening the on-off valve V1 described later) to supply the air into the milk flow path L1 and by driving the pump 9, the beverage supply apparatus 100 enables production of the mixed beverage of milk and air, the delivery of this mixed beverage from the beverage delivery port 13, and the supply of it into the cup C.

Next, each instrument provided in the milk flow path L1 and the water flow path L3 will be described in detail.

The milk flow path L1 is provided with the strainer 14, the on-off valve V1, the pump 9, the heating device 8, and the switching valve V2, in the order from the milk tank 5 side toward the beverage delivery port 13. The connecting part Z1 is positioned between the on-off valve V1 and the pump 9.

The on-off valve V1 is the valve for opening and closing the milk flow path L1, and is constituted by, for example, the electromagnetic valve which is closed (NC) in the initial state (power source OFF).

The switching valve V2 is the valve for selectively switching the delivery destination of the milk or the like flowing through the milk flow path L1 between the beverage delivery port 13 and the drain pipe L2, and is constituted by, for example, the electromagnetic three-way valve. The switching valve V2, for example, in the initial state (power OFF), allows flow to the drain pipe L2 side and blocks flow to the beverage delivery port 13 side. The switching valve V2, in the energized state (power ON), is operated to block flow to the drain pipe L2 side and to allow flow to the beverage delivery port 13 side.

The water flow path L3 is provided with a check valve C1. The check valve C1 is disposed between the connecting part Z1 and the connecting part Z2, allows flow from the water supply device 10 to the connecting part Z1, and blocks flow from the connecting part Z1 to the water supply device 10 and to the air supply device 11. The check valve C1 is set to have the opening pressure that the check valve C1 promptly opens when the water supply device 10 and the air supply device 11 are operated.

Figure 5:
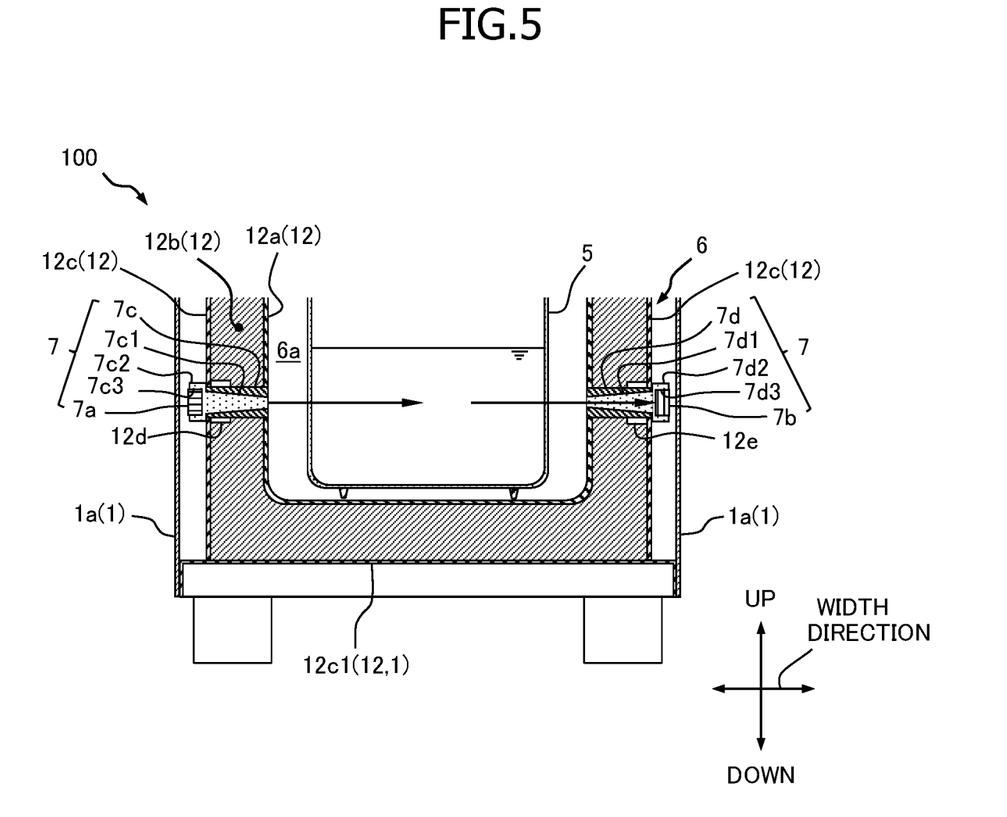
FIG. 5 is a partial sectional view of a portion including a cooling device and a detection device of the beverage supply apparatus.

Next, the multilayer structure of the partition wall 12 of the cooling device 6 is described with reference to FIGS. 2-5. FIG. 5 is the partial cross-sectional view of the beverage supply apparatus 100 at the B-B cross-sectional position illustrated in FIG. 3, and specifically is the partial cross-sectional view of the part including the cooling device 6 on the lower part side of the beverage supply apparatus 100.

In the present embodiment, as illustrated in FIG. 5, the partition wall 12 includes an inner wall 12a having the inner surface exposed to the storage chamber 6a, a heat insulating member 12b disposed to cover the periphery of the inner wall 12a, and an outer wall 12c disposed to cover the periphery of the heat insulating member 12b. In the present embodiment, the heat insulating member 12b is filled between the inner wall 12a and the outer wall 12c. As described above, the partition wall 12 is formed in the substantially rectangular parallelepiped shape as a whole. The partition wall 12 has the multilayer structure including the inner wall 12a, the heat insulating member 12b, and the outer wall 12c in the order from the inside toward the outside. The inner wall 12a is, for example, made of the resin material, and is formed in the substantially rectangular parallelepiped shape by injection molding. The outer wall 12c is, for example, composed of the assembly of a plurality of metal plates. The bottom wall 12c1 of the outer wall 12c also serves as the bottom of the housing 1, for example. The inner wall 12a is disposed such that the gap is generated between the outer surface of the inner wall 12a and the inner surface of the outer wall 12c which is composed of the assembly. The heat insulating member 12b is formed, for example, by filling and foaming the foam material in the gap between the inner wall 12a and the outer wall 12c.

Next, the attachment structure and the attachment position of the light projection unit 7a and light receiving unit 7b of the detection device 7 will be described with reference to FIGS. 2 to 5.

The detection device 7 further includes a first light guide body 7c for the attachment and the light guide of the light projection unit 7a, and a second light guide body 7d for the attachment and the light guide of the light receiving unit 7b.

The first light guide body 7c is provided to penetrate a predetermined part of the partition wall 12. In the present embodiment, the first light guide body 7c is made of a resin material, for example, and is formed in a tubular shape which has the tube hole penetrated from one end to the other end. The light projection unit 7a is attached to the partition-wall outer-surface-side end (the outer wall 12c side end) of the first light guide body 7c. The light projection unit 7a projects light toward the milk tank 5 via the first light guide body 7c.

The first light guide body 7c, for example, penetrates the part at a predetermined height of the lower part in the up and down direction in one end wall (the left wall in FIG. 5) in the width direction of the partition wall 12. Specifically, the first light guide body 7c is disposed such that one end surface in the extending direction is flush with the inner surface of the inner wall 12a and the other end surface in the extending direction is flush with the outer surface of the outer wall 12c. Accordingly, the first light guide body 7c penetrates the inner wall 12a, the heat insulating member 12b, and the outer wall 12c at the predetermined part of the partition wall 12 (that is, the part at the predetermined height of the one end wall). Additionally, the tube hole of the first light guide body 7c is formed such that the hole diameter of the tube hole decreases toward the inner wall 12a.

The second light guide body 7d is provided to penetrate a predetermined part of the partition wall 12 which faces the first light guide body 7c. In the present embodiment, the second light guide body 7d is made of a resin material, for example, and is formed in a tubular shape which has the tube hole penetrated from one end to the other end. The light receiving unit 7b is attached to the partition-wall outer-surface-side end (outer wall 12c side end) of the second light guide body 7d. The light receiving unit 7b can receive the light transmitted through the milk tank 5 via the second light guide body 7d.

The second light guide body 7d, for example, penetrates the part at a predetermined height corresponding to that of the first light guide body 7c in the other end wall (the right wall in FIG. 5) in the width direction of the partition wall 12. Specifically, the second light guide body 7d is disposed such that one end surface in the extending direction is flush with the inner surface of the inner wall 12a and the other end surface in the extending direction is flush with the outer surface of the outer wall 12c. Accordingly, the second light guide body 7d penetrates the inner wall 12a, the heat insulating member 12b, and the outer wall 12c at the predetermined part of the partition wall 12 (that is, the part at the predetermined height of the other end wall). The tube hole of the second light guide body 7d is formed such that the hole diameter of the tube hole decreases toward the inner wall 12a.

In the present embodiment, the first light guide body 7c has a first light guide member 7c1 in the tube hole, and the first light guide body 7c guides the light projected from the light projection unit 7a to the milk tank 5 side. The light projection unit 7a projects light toward the milk tank 5 via the first light guide member 7c1. The first light guide member 7c1 is made of a resin material, for example, and is formed in the generally truncated cone shape whose diameter is reduced toward the inner wall 12a in accordance with the cylinder inner diameter of the first light guide body 7c. The first light guide member 7c1 is inserted into the tube hole of the first light guide body 7c to completely shut the tube hole of the first light guide body 7c. Additionally, the first light guide member 7c1 is disposed such that one end surface on the inner wall 12a side of the first light guide member 7c1 is flush with the inner surface of the inner wall 12a.

In the present embodiment, the light projection unit 7a is provided at the partition-wall outer-surface-side end of the first light guide body 7c by being attached to the partition-wall outer-surface-side end of the first light guide member 7c1. Specifically, on the partition-wall outer-surface-side end of the first light guide member 7c1, a first protrusion portion 7c2 protrudes outward from the outer surface of the outer wall 12c. A concave-shaped first concave portion 7c3 is formed in the first protrusion portion 7c2, and the light projection unit 7a is fixed in the first concave portion 7c3.

In the present embodiment, the second light-guiding body 7d has a second light guide member 7d1 in the tube hole, and the second light guide member 7d1 guides the light transmitted through the milk tank 5 to the light receiving unit 7b side. The light receiving unit 7b receives the light transmitted through the milk tank 5 via the second light guide member 7d1. The second light guide member 7d1 is made of a resin material, for example, and is formed in the generally truncated cone shape whose diameter is reduced toward the inner wall 12a in accordance with the cylinder inner diameter of the second light guide body 7d. The second light guide member 7d1 is inserted into the tube hole of the second light guide body 7d to completely shut the tube hole of the second light guide body 7d. Additionally, the second light guide member 7d1 is disposed such that one end surface on the inner wall 12a side of the second light guide member 7d1 is flush with the inner surface of the inner wall 12a.

In the present embodiment, the light receiving unit 7b is provided at the partition-wall outer-surface-side end of the second light guide body 7d by being attached to the partition-wall outer-surface-side end of the second light guide member 7d1. Specifically, on the partition-wall outer-surface-side end of the second light guide member 7d1, a second protrusion portion 7d2 protrudes outward from the outer surface of the outer wall 12c. A concave-shaped second concave portion 7d3 is formed in the second protrusion portion 7d2, and the light receiving unit 7b is fixed in the second concave portion 7d3.

In the present embodiment, the outer wall 12c is provided with a first support portion 12d for supporting the first light guide body 7c and a second support portion 12e for supporting the second light guide body 7d.

The first support portion 12d is provided at the penetration part of the first light guide body 7c in the outer wall 12c to support the partition-wall outer-surface-side end of the first light guide body 7c. Specifically, the first support portion 12d is fixed to the inner surface side in the penetration part of the outer wall 12c, and has the fitting hole into which the first light guide body 7c is fitted. For example, the partition-wall inner-surface-side end of the first light guide body 7c is welded to the inner wall 12a, and the partition-wall outer-surface-side end of the first light guide body 7c is supported by the first support portion 12d.

A second support portion 12e is provided at the penetration part of the second light guide body 7d in the outer wall 12c to the second support portion 12e supports the partition-wall outer-surface-side end of the second light guide body 7d. Specifically, the second support portion 12e is fixed to the inner surface side in the penetration part of the outer wall 12c, and has the fitting hole into which the second light guide body 7d is fitted. For example, the partition-wall inner-surface-side end of the second light guide body 7d is welded to the inner wall 12a, and the partition-wall outer-surface-side end of the second light guide body 7d is supported by the second support portion 12e. Additionally, the first light guide body 7c and the second light guide body 7d may be formed integrally with the inner wall 12a by injection molding and the like, at the time of molding the inner wall 12a.

Operation of Beverage Supply Apparatus

Next, the beverage delivery operation of the beverage supply apparatus 100 according to the present embodiment will be described with reference to the drawings. The following description will be made under the assumption that sufficient milk is stored in the milk tank 5 and that the detection device 7 detects the presence of the milk.

First, when the supply instructions S1 to S4 are input from the coffee server 50, the controller 2 operates the switching valve V2 to switch the delivery destination of the milk flow path L1 to the beverage delivery port 13, and operates the pump 9.

When the instruction for supplying cold milk (supply instruction S3) is input, the controller 2 causes the cold milk that is cooled by the cooling device 6 to flow through via the bypass pipe in the heating device 8. Accordingly, the main body unit 3 delivers a predetermined amount of cold milk which is drawn from the milk tank 5 from the beverage delivery port 13 and supplies it into the cup C.

When the instruction for supplying cold mixed beverage is input (supply instruction S4), the controller 2 operates the air supply device 11, and causes the mixed beverage that is generated by mixing the air in the milk that is cooled by the cooling device 6 to flow through via the bypass pipe in the heating device 8. Accordingly, the main body unit 3 supplies a predetermined amount of the cold mixed beverage as it is from the beverage delivery port 13 into the cup C. That is, in the supply instructions S3 and S4, the beverage supply apparatus 100 supplies the beverage containing milk (milk or mixed beverage of milk and air) that is cooled by the cooling device 6 to the outer portion.

When the instruction for supplying hot milk (supply instruction S1) is input, the controller 2 heats the cold milk that is cooled by the cooling device 6 by the heating device 8 and causes the heated milk to flow out toward the beverage delivery port 13. By heating the cold milk drawn from the milk tank 5 by the heating device 8, the main body unit 3 delivers a predetermined amount of hot milk from the beverage delivery port 13 and supplies it into the cup C.

When the instruction for supplying hot mixed beverage (supply instruction S2) is input, the controller 2 operates the air supply device 11, and causes the cold mixed beverage that is generated by mixing the air in the milk that is cooled by the cooling device 6, to flow through via the bypass pipe in the heating device 8. Accordingly, the main body unit 3 supplies a predetermined amount of hot mixed beverage from the beverage delivery port 13 into the cup C. That is, in the supply instructions S1 and S2, the beverage supply apparatus 100 supplies the beverage containing milk (milk or mixed beverage of milk and air) that is heated by the heating device 8 to the outer portion.

In the beverage supply apparatus 100 according to the present embodiment, the storage chamber 6a of the cooling device 6 is partitioned by the partition wall 12 which is formed of the box body having the multilayer structure and an end part of the box body having the opening 121 closed by the door 4. The detection device 7 projects light via the first light guide body 7c toward the milk tank 5 by using the light projection unit 7a which is attached to the partition-wall outer-surface-side end of the first light guide body 7c that is provided to penetrate the predetermined part of the partition wall 12. Furthermore, the detection device 7 can receive the light transmitted through the milk tank 5 via the second light guide body 7d by using the light receiving unit 7b which is attached to the partition-wall outer-surface-side end of the second light guide body 7d that is provided to penetrate the predetermined part of the partition wall 12 which faces the first light guide body 7c; and the detection device detects the presence or absence of milk in the milk tank 5 based on the light reception state in the light receiving unit 7b. That is, the light projection unit 7a can project the light from the outside of the partition wall 12 which is formed of the box body that partitions the storage chamber 6a toward the storage chamber 6a via the first light guide body 7c, and the light receiving unit 7b can receive the light transmitted through the milk tank 5 at the outside of the partition wall 12 which is formed of the box body via the second light guide body 7d. Accordingly, both the light projection unit 7a and the light receiving unit 7b in the detection device 7 are disposed outside of the partition wall 12 which is formed of the box body.

Accordingly, for example, even if there is ingress of external air in the storage chamber 6a at the time of replacement of the milk tank 5 and replenishment of milk into the milk tank 5, the light projection unit 7a and the light receiving unit 7b are both disposed externally of the partition wall 12, and thus, the adhesion of condensation water to the light projection unit 7a and the light receiving unit 7b is prevented or inhibited. As a result, the occurrence of the detection operation failure or damage in the detection device 7 is prevented or inhibited.

Therefore, there can be provided the beverage supply apparatus 100 which includes the detection device 7 that detects the presence or absence of milk, and that can prevent or inhibit the occurrence of the detection operation failure or damage due to the ingress of external air into the storage chamber 6a of the cooling device 6.

Additionally, since the light projection unit 7a and the light receiving unit 7b are disposed externally of the partition wall 12, there is no need to employ the waterproof or drip-proof element as the element for the light projection unit 7a or the light receiving unit 7b. As a result, the cost of the detection device 7 can be relatively low.

Furthermore, the light projection unit 7a and the light receiving unit 7b can detect the presence or absence of milk without contacting the milk or the milk tank 5. Thus, since the light projection unit 7a and the light receiving unit 7b are physically separated from the milk tank 5, the detection device 7 is excellent in terms of hygiene. Furthermore, the light projection unit 7a and the light receiving unit 7b do not need to be detached or replaced when the administrator or the like replaces the milk tank 5 or replenishes milk in the milk tank 5. Thus, the efficiency of operations such as the replacement of the milk tank 5 and the replenishment of milk can be improved.

Additionally, in the present embodiment, the first light guide member 7c1 is provided in the tube hole of the first light guide body 7c, and the second light guide member 7d1 is provided in the tube hole of the second light guide body 7d. Accordingly, the light projected from the light projection unit 7a is efficiently guided to the milk tank 5 side, and the light receiving efficiency in the light receiving unit 7b is improved. Additionally, the tube hole of the first light guide body 7c can be shut by the first light guide member 7c1, and the tube hole of the second light guide body 7d can be shut by the second light guide member 7d1. Thus, the cold air in the storage chamber 6a can be prevented from being released via the tube hole of the first light guide body 7c and the tube hole of the second light guide body 7d. As a result, the light projection unit 7a attached to the partition-wall outer-surface-side end of the first light guide body 7c and the light receiving unit 7b attached to the partition-wall outer-surface-side end of the second light guide body 7d can be prevented from being cooled by the cold air, and consequently, the adhesion of condensation water to the light projection unit 7a and the light receiving unit 7b can be reliably prevented.

Specifically, the first light guide member 7c1 is formed so as to be reduced in diameter toward the inner wall 12a in accordance with the cylinder inner diameter of the first light guide body 7c, and the second light guide member 7d1 is formed so as to be reduced in diameter toward the inner wall 12a in accordance with the cylinder inner diameter of the second light guide body 7d. Accordingly, the tube hole of the first light guide body 7c and the tube hole of the second light guide body 7d can be shut with good sealing properties, and the cold air can more reliably be prevented from being released.

In the present embodiment, the light projection unit 7a is provided at the partition-wall outer-surface-side end of the first light guide body 7c by being attached to the partition-wall outer-surface-side end of the first light guide member 7c1, and the light receiving unit 7b is provided on the partition-wall outer-surface-side end of the second light guide body 7d by being attached to the partition-wall outer-surface-side end of the second light guide member 7d1. That is, the attachment portion of the light projection unit 7a is integrally formed with the first light guide member 7c1, and the attachment portion of the light receiving unit 7b is integrally formed with the second light guide member 7d1. Accordingly, the simple shapes can be employed for the partition-wall outer-surface-side end of the first light guide body 7c and the partition-wall outer-surface-side end of the second light guide body 7d themselves, for example. As a result, the degree of freedom of the fixing method of the first light guide body 7c and the second light guide body 7d can be improved, and the first light guide body 7c and the second light guide body 7d can be easily integrally formed with the inner wall 12a.

In the present embodiment, the partition wall 12 forms the multilayer structure having the inner wall 12a, the heat insulating member 12b, and the outer wall 12c. Each of the first light guide body 7c and the second light guide body 7d penetrates the inner wall 12a, the heat insulating member 12b, and the outer wall 12c. That is, each of the light projection unit 7a and the light receiving unit 7b is disposed externally of the outer wall 12c, and the heat insulating member 12b and the outer wall 12c are disposed between the storage chamber 6a and the light projection unit 7a, and between the storage chamber 6a and the light receiving unit 7b, respectively. Therefore, the light projection unit 7a and the light receiving unit 7b can be more reliably prevented from being cooled, and consequently, the adhesion of condensation water to the light projection unit 7a and to the light receiving unit 7b can be more reliably prevented. Additionally, the first light guide body 7c, the second light guide body 7d, the first light guide member 7c1, and the second light guide member 7d1 are all made of a resin material. Therefore, these members (7c, 7d, 7c1, 7d1) also function as the heat insulating members, and more reliably prevent the light projection unit 7a and the light receiving unit 7b from being cooled.

The present embodiment further includes a first support portion 12d that is provided at the penetration part of the first light guide body 7c in the outer wall 12c and that supports the partition-wall outer-surface-side end of the first light guide body 7c, and a second support portion 12e that is provided at the penetration part of the second light guide body 7d in the outer wall 12c and that supports the partition-wall outer-surface-side end of the second light guide body 7d. Accordingly, for example, in a state in which the first light guide body 7c and the second light guide body 7d are welded to the inner wall 12a in advance or integrally formed with the inner wall 12a, the inner wall 12a can be easily positioned and fixed while a predetermined gap with the outer wall 12c is retained by using the first support portion 12d and the second support portion 12e. In this state, for example, the foam material is filled and foamed in the gap between the inner wall 12a and the outer wall 12c so that the heat insulating member 12b can be formed. As a result, the heat insulating member 12b can be easily formed between the inner wall 12a and the outer wall 12c. Additionally, since the heat insulating member 12b can be attached to the peripheries of the first light guide body 7c and the second light guide body 7d with good sealing properties, the decrease in heat insulating properties due to the structure of the first light guide body 7c and the second light guide body 7d penetrating the heat insulating member 12b can be reliably prevented.

In the present embodiment, one end surfaces on the inner wall 12a side of the first light guide body 7c, the second light guide body 7d, the first light guide member 7c1, and the second light guide member 7d1 are respectively provided to be flush with the inner surface of the inner wall 12a. For this reason, the workability at the time of cleaning the storage chamber 6a can be improved.

In the present embodiment, the exemplary case in which the first support portion 12d and the second support portion 12e are provided has been described, but the first support portion 12d and the second support portion 12e may not be provided. In this case, for example, the partition-wall outer-surface-side end of the first light guide body 7c is fitted into the through hole that is formed in the outer wall 12c, and the partition-wall outer-surface-side end of the second light guide body 7d is fitted into the through hole that is formed in the outer wall 12c so that the inner wall 12a can be positioned and fixed in the outer wall 12c. In this case also, the decrease in heat insulating properties due to the structure of the first light guide body 7c and the second light guide body 7d penetrating the heat insulating member 12b can be reliably prevented.

Moreover, in the present embodiment, the first light guide body 7c is formed in the tubular shape, and has the first light guide member 7c1 in the tube hole of the first light guide body 7c. The second light guide body 7d is formed in the tubular shape and has the second light guide member 7d1 in the tube hole of the second light guide body 7d. That is, each of the first light guide body 7c and the second light guide body 7d has the tubular body and the light guide member, but the first light guide body 7c and the second light guide body 7d are not limited to this. For example, as illustrated in FIG. 6, each of the first light guide body 7c and the second light guide body 7d may be formed in a bottomed tubular shape in which the partition-wall inner-surface-side end is closed, or may each be formed in a solid column shape, as illustrated in FIG. 7.

Figure 6:
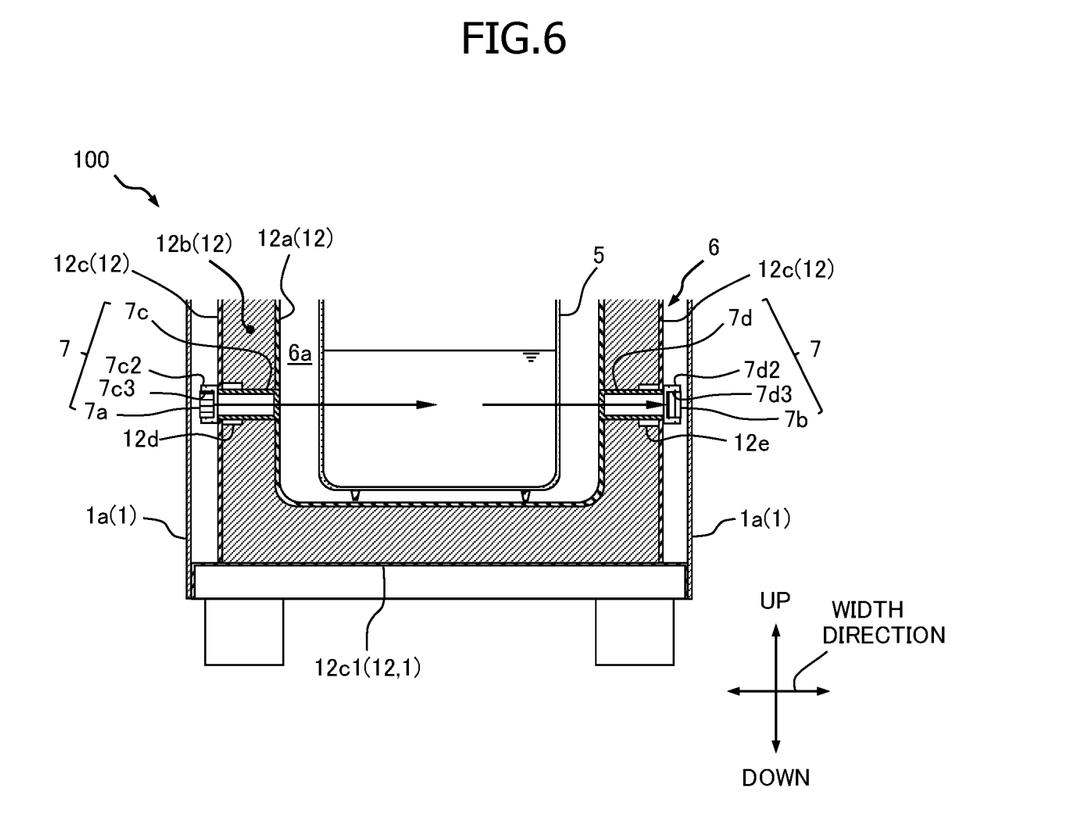
FIG. 6 is a partial sectional view for explaining a modification of the detection device.
Figure 7:
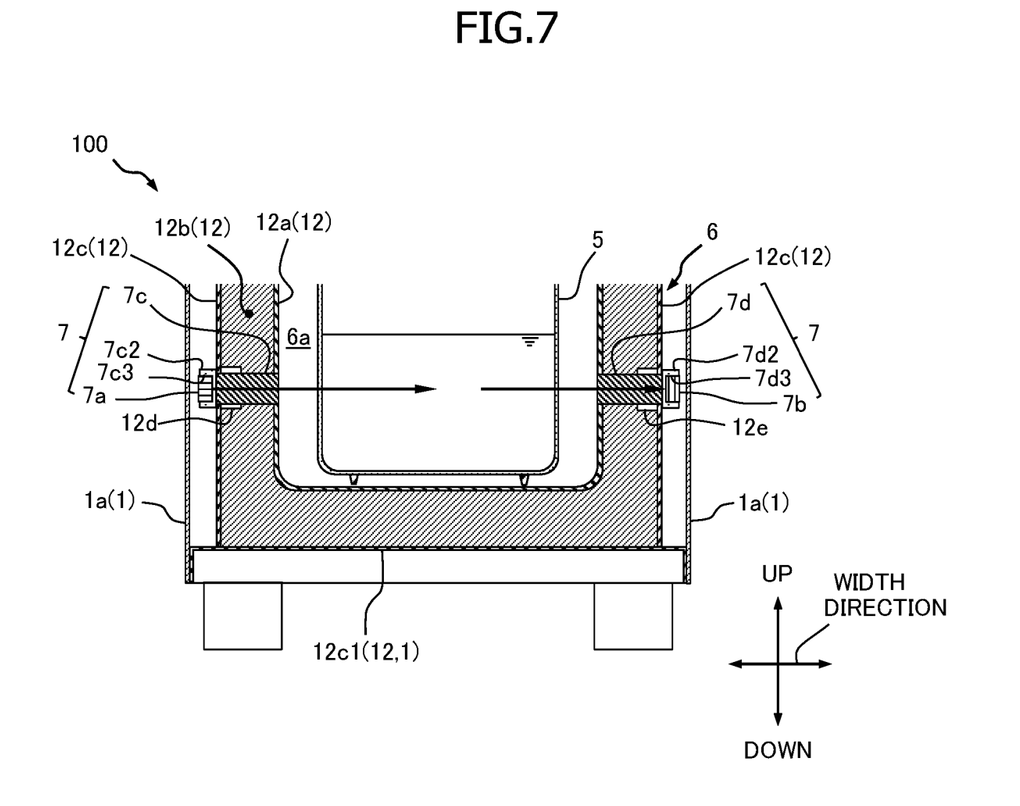
FIG. 7 is a partial sectional view for explaining another modification of the detection device.

As illustrated in FIG. 6, when the first light guide body 7c and the second light guide body 7d are formed in the bottomed tubular shape (Modification 1), it is only required that the first light guide body 7c and the second light guide body 7d are formed with the member in which at least the tubular bottom part can transmit light. Additionally, as illustrated in FIG. 7, when the first light guide body 7c and the second light guide body 7d are formed in a solid column shape (Modification 2), the first light guide body 7c and the second light guide body 7d are each formed in a cylindrical shape as a whole by the member that can transmit light, for example. In Modifications 1 and 2, the first protrusion portion 7c2 is fixed to the partition-wall outer-surface-side end of the first light guide body 7c, and the second protrusion portion 7d2 is fixed to the partition-wall outer-surface-side end of the second light guide body 7d, for example. In the modified examples 1 and 2, the light from the light projection unit 7a can be guided to the milk tank 5 side, and the light transmitted through the milk tank 5 can be guided to the light receiving unit 7b. It is also possible to reliably prevent the cold air from being released from the storage chamber 6a, and consequently, to reliably prevent the condensation water from adhering to the light projection unit 7a and the light receiving unit 7b.

Additionally, in the present embodiment, the partition wall 12 has the inner wall 12a, the heat insulating member 12b and the outer wall 12c; and each of the first light guide body 7c and the second light guide body 7d penetrates the inner wall 12a, the heat insulating member 12b and the outer wall 12c. However, the partition wall 12, the first light guide body 7c and the second light guide body 7d are not limited to the present embodiment. For example, when the sufficient heat insulation performance can be obtained without disposing the outer wall 12c around the heat insulating member 12b, the partition wall 12 may simply include the inner wall 12a and the heat insulating member 12b, and each of the first light guide body 7c and the second light guide body 7d may penetrate the inner wall 12a and the heat insulating member 12b. In this case, the heat insulating member 12b is formed in a plate shape in advance, for example, and the plurality of plate-shaped heat insulating members 12b may be disposed to cover the periphery of the inner wall 12a. Accordingly, the outer wall 12c becomes unnecessary, and thus, the cost of the cooling device 6 can be relatively low, and the weight of the cooling device 6 can be reduced. Additionally, each of the light projection unit 7a and the light receiving unit 7b is disposed externally of the heat insulating member 12b, and the heat insulating member 12b is disposed between the storage chamber 6a and the light projection unit 7a and between the storage chamber 6a and the light receiving unit 7b. Therefore, the light projection unit 7a and the light receiving unit 7b can be reliably prevented from being cooled, and consequently, the adhesion of the condensation water to the light projection unit 7a and to the light receiving unit 7b can be reliably prevented. Additionally, in this case, the first light guide body 7c and the second light guide body 7d may be directly attached to the heat insulating members 12b by adhesion, fitting or the like. Furthermore, the concave portions may be provided in the outer surfaces of the heat insulating member 12b to accommodate and fix the light projection unit 7a and the light receiving unit 7b in the concave portions. Accordingly, the light projection unit 7a and the light receiving unit 7b can be protected, and the light projection unit 7a and the light receiving unit 7b can be provided without being protruded from the outer surface of the heat insulating member 12b which becomes the outer surface of the cooling device 6.

As described above, the partition wall 12 at least includes the inner wall 12a having the inner surface exposed to the storage chamber 6a, and the heat insulating member 12b disposed to cover the periphery of the inner wall 12a; and each of the first light guide body 7c and the second light guide body 7d penetrates the inner wall 12a and the heat insulating member 12b.

Additionally, in the present embodiment, the inner wall 12a is made of a resin material and is formed by injection molding, but the inner wall 12a is not limited to this. The inner wall 12a may be formed by attaching the film, the foil, the thin plate or the like that is made of a predetermined material (aluminum, resin, etc.) to the surface of the plate-like heat insulating member 12b (the surface on the side of the storage chamber 6a, that is, the inner surface). That is, the thickness of the inner wall 12a is not particularly limited, and the inner wall 12a may be formed in a thin layer shape having the waterproof and moisture-proof functions on the inner surface of the heat insulating member 12b. The thickness of the heat insulating member 12b and the thickness of the outer wall 12c are also not particularly limited, and may be formed in a thin layer shape like the inner wall 12a. That is, it is only required that the partition wall 12 be the box body having the multilayer structure, and that an end part of the box body have the opening 121 closed by the predetermined closing member such as the door 4 or the lid.

In the present embodiment, the milk tank 5 is made of the member that can transmit light as a whole. However, the milk tank 5 is not limited this, and may be made of the member in which at least parts corresponding to the first light guide body 7c and the second light guide body 7d can transmit light.

In the present embodiment, the opening 121 of the partition wall 12 and the opening of the housing 1 are open at the front end portion of the partition wall 12 and the housing 1, but the opening direction is not particularly limited. Instead, the opening 121 of the partition wall 12 and the opening of the housing 1 may be formed in the end portions in predetermined directions, for example, the upper end portion and the rear end portion of the partition wall 12 and the housing 1. Additionally, for example, when the opening 121 is formed in the upper end portion, the opening 121 is not limited to the closure by the door 4 but by the predetermined closing member such as the lid.

In the present embodiment, the detection device 7 simply detects the presence or absence of milk in the milk tank 5, but the detection device 7 is not limited to this. The detection device 7 may be capable of detecting the remaining amount of milk in the milk tank 5. In this case, for example, the light projection unit 7a and the light receiving unit 7b are arranged in an array apart from each other in the up and down direction, and the remaining amount of milk may be detected based on the light reception state in the light receiving unit 7b at each height position.

In the present embodiment, although the beverage supply apparatus 100 can supply the hot beverage (milk or mixed beverage) and the cold beverage (milk or mixed beverage), the beverage supply apparatus 100 is not limited to this, and it may supply the cold beverage only. Moreover, although the milk or the mixed beverage can be selectively supplied in the present embodiment, the present embodiment is not limited to this, and only the milk or only the mixed beverage may be supplied. If the hot beverage is not supplied, the heating device 8 is unnecessary, and if the mixed beverage is not supplied, the air supply device 11 is unnecessary. Moreover, if the inside of the milk flow path L1 does not need to be rinsed, the water supply device 10 is unnecessary.

In the present embodiment, although the beverage supply apparatus 100 can selectively supply the milk or the mixed beverage, the beverage supply apparatus 100 is not limited to this, but in response to one supply instruction, the milk and the mixed beverage may be continuously supplied, or only the milk or only the mixed beverage may be supplied. Furthermore, the beverage supply apparatus 100 may supply the appropriate liquid beverage instead of the milk, or may supply the mixed beverage of the appropriate liquid beverage and the air as well as the mixed beverage of the milk and the air. That is, it is only required that the beverage supply apparatus 100 supply the beverage containing the liquid beverage that is cooled by the cooling device 6 to the outer portion. Additionally, although the beverage supply apparatus 100 is provided adjacent to the coffee server 50, the beverage supply apparatus 100 is not limited to this, and the entirety thereof or a part of the beverage supply apparatus 100 may be integrated in the coffee server 50. Furthermore, although the beverage supply apparatus 100 is used as an optional apparatus of the coffee server 50, the beverage supply apparatus 100 is not limited to this, and it can be used as the optional apparatus of the supply apparatus of the appropriate beverage, or can be used independently as the apparatus for supplying the beverage.

The present invention is not limited to the preferred embodiments and the examples of modifications described above, and various modifications and modifications based on the technical concept of the present invention are possible.

REFERENCE SYMBOL LIST

5 Milk tank (Liquid beverage container)
6 Cooling device
6a Storage chamber
7 Detection device
7a Light projection unit
7b Light receiving unit
7c First light guide body
7c1 First light guide member
7d Second light guide body
7d1 Second light guide member
12 Partition wall
12a Inner wall
12b Heat insulating member
12c Outer wall
12d First support portion
12e Second support portion
100 Beverage supply apparatus
121 Opening

The invention claimed is:

1. A beverage supply apparatus comprising a cooling device which has a storage chamber partitioned by a partition wall and which cools air in the storage chamber, a liquid beverage container accommodated in the storage chamber, and a detection device for detecting presence or absence of or a remaining amount of a liquid beverage in the liquid beverage container, wherein the beverage supply apparatus supplies a beverage including the liquid beverage cooled by the cooling device to an outer portion, wherein the partition wall is a box body having a multilayer structure, and an end part of the box body has an opening that is closed by a predetermined closing member, the detection device has a first light guide body provided to penetrate a predetermined part of the partition wall, a second light guide body provided to penetrate a predetermined part of the partition wall which faces the first light guide body, a light projection unit which is attached to a partition-wall outer-surface-side end of the first light guide body and which projects light toward the liquid beverage container via the first light guide body, and a light receiving unit which is attached to a partition-wall outer-surface-side end of the second light guide body and which can receive the light transmitted through the liquid beverage container via the second light guide body, the detection device detects the presence or absence of, or the remaining amount of, the liquid beverage based on a light reception state in the light receiving unit, and the liquid beverage container is made of a member in which at least parts corresponding to the first light guide body and the second light guide body can transmit the light.

2. The beverage supply apparatus according to claim 1, wherein each of the first and second light guide bodies is formed in a tubular shape having a tube hole penetrated from one end to the other end, the first light guide body has a first light guide member in the tube hole, and the first light guide member guides the light projected from the light projection unit to the liquid beverage container side, and the second light guide body has a second light guide member in the tube hole, and the second light guide body guides the light transmitted through the liquid beverage container to the light receiving unit side.

3. The beverage supply apparatus according to claim 2, wherein the light projecting unit is provided at the partition-wall outer-surface-side end of the first light guide body by being attached to the partition-wall outer-surface-side end of the first light guide member, and the light receiving unit is provided at the partition-wall outer-surface-side end of the second light guide body by being attached to the partition-wall outer-surface-side end of the second light guide member.

4. The beverage supply apparatus according to claim 1, wherein each of the first and second light guide bodies is formed in a bottomed tubular shape in which a partition-wall inner-surface-side end is closed.

5. The beverage supply apparatus according to claim 1, wherein each of the first and second light guide bodies is formed in a solid column shape.

6. The beverage supply apparatus according to claim 1, wherein the partition wall at least has an inner wall having an inner surface that is exposed to the storage chamber, and a heat insulating member disposed to cover a periphery of the inner wall, and each of the first and second light guide bodies penetrates the inner wall and the heat insulating member.

7. The beverage supply apparatus according to claim 6, wherein the partition wall further includes an outer wall disposed to cover the periphery of the heat insulating member, and the heat insulating member is filled between the inner wall and the outer wall, each of the first and second light guide bodies penetrates the inner wall, the heat insulating member, and the outer wall, and the partition wall further includes a first support portion which is provided at a penetration part of the first light guide body in the outer wall and which supports the partition-wall outer-surface-side end of the first light guide body, and a second support portion which is provided at a penetration part of the second light guide body in the outer wall and which supports the partition-wall outer-surface-side end of the second light guide body.

* * * * *